United States Patent
Gribetz et al.

(10) Patent No.: US 10,026,231 B1
(45) Date of Patent: Jul. 17, 2018

(54) SYSTEM AND METHOD FOR PROVIDING VIEWS OF VIRTUAL CONTENT IN AN AUGMENTED REALITY ENVIRONMENT

(71) Applicant: META COMPANY, San Mateo, CA (US)

(72) Inventors: Meron Gribetz, Belmont, CA (US); Rebecca B. Frank, Los Angeles, CA (US)

(73) Assignee: Meta Company, San Mateo, CA (US)

( * ) Notice: Subject to any disclaimer, the term of this patent is extended or adjusted under 35 U.S.C. 154(b) by 144 days.

(21) Appl. No.: 15/263,313

(22) Filed: Sep. 12, 2016

(51) Int. Cl.
| | |
|---|---|
| G06T 19/00 | (2011.01) |
| G02B 27/01 | (2006.01) |
| G02B 27/00 | (2006.01) |
| G06F 3/01 | (2006.01) |
| G06F 3/0481 | (2013.01) |
| G06F 3/0482 | (2013.01) |

(52) U.S. Cl.
CPC ........ *G06T 19/006* (2013.01); *G02B 27/0093* (2013.01); *G02B 27/0172* (2013.01); *G06F 3/017* (2013.01); *G06F 3/04815* (2013.01); *G02B 2027/014* (2013.01); *G02B 2027/0141* (2013.01); *G06F 3/0482* (2013.01)

(58) Field of Classification Search
CPC ... G06T 19/006; G06F 3/017; G06F 3/04815; G06F 3/0482; G02B 27/0093; G02B 27/0172; G02B 2027/0141; G02B 2027/014

USPC .......................................................... 345/633
See application file for complete search history.

(56) References Cited

U.S. PATENT DOCUMENTS

| | | | |
|---|---|---|---|
| 2012/0218423 A1* | 8/2012 | Smith | G06Q 30/02 348/207.1 |
| 2015/0235088 A1* | 8/2015 | Abovitz | G06K 9/00671 345/633 |
| 2017/0235143 A1 | 8/2017 | Chi | |

* cited by examiner

*Primary Examiner* — Ke Xiao
*Assistant Examiner* — Kim-Thanh T Tran
(74) *Attorney, Agent, or Firm* — Sheppard Mullin Richter & Hampton LLP

(57) ABSTRACT

A system configured for providing views of virtual content in an augmented reality environment may comprise one or more of a light source, an optical element, one or more physical processor, non-transitory electronic storage, and/or other components. The light source may be configured to emit light. The optical element being configured to reflect light emitted from the light source into one or more eyes of a user. The non-transitory electronic storage may be configured to store virtual content information defining virtual content. The virtual content may include one or more of an annular dock, one or more virtual objects, and/or other virtual content. The annular dock may comprise a set of sockets. The annular dock may be configured to simulate removable engagement of individual virtual objects to individual sockets. The light source may be controlled to generate views of the annular dock to be perceived as surrounding the user.

16 Claims, 9 Drawing Sheets

SYSTEM AND METHOD FOR PROVIDING VIEWS OF VIRTUAL CONTENT IN AN AUGMENTED REALITY ENVIRONMENT

FIELD OF THE INVENTION

The system and methods described herein relate to providing views of virtual content in an augmented reality (AR) environment.

BACKGROUND OF THE INVENTION

There are many types of vision systems that provide virtual or augmented reality displays. In particular, wearable technology such as head mounted displays (HMD) are becoming more popular.

SUMMARY

The systems and methods described herein facilitate providing views of virtual content (e.g., virtual objects in the form of three dimensional digital imagery) in a virtual environment, such as an augmented reality environment. Virtual content may be perceived to lie in a three dimensional light field within a viewing users field-of-view to create an augmented reality experience. A system configured for providing views of virtual content in a virtual environment, such as an augmented reality environment, may comprise one or more of one or more light sources, one or more optical elements, non-transitory electronic storage, one or more physical processors, and/or other components.

The one or more light source may be configured to emit light. The one or more light source may project images onto the one or more optical elements to be previewed as virtual content within an augmented reality environment. An optical element may comprise, for example, a visor of an HMD, and/or other components. An optical element may be configured to reflect light emitted from the light source to one or more eyes of a user. The reflected light may generate a perceived three-dimensional light field include virtual content within the viewing user's field-of-view.

The non-transitory electronic storage may be configured to store virtual content information and/or other information. The virtual content information may define virtual content. The virtual content may include one or more of one or more annular docks, one or more virtual objects, and/or other virtual content. An annular dock may comprise a set of sockets and/or other components. Individual sockets in a set of sockets may be positioned at discrete locations on an annular dock. For example, individual sockets may be equally spaced apart on an annular dock and/or arranged in other ways. An annular dock may be configured to simulate removable attachment of individual virtual objects to individual sockets.

The one or more physical processor may be configured by machine-readable instructions. Executing the machine-readable instructions may cause the one or more physical processors to facilitate providing views of virtual content in an augmented reality environment. The machine-readable instructions may comprise one or more computer program components. The one or more computer program components may comprise one or more of a control component, an input component, a mode component, and/or other components.

The control component may be configured to control one or more light sources to generate views of virtual content. The virtual content may be generated to be perceived within a three-dimensional light field in a user's field-of-view. The control component may be configured to control the one or more light sources to generate a view of an instance of an annular dock to be perceived as surrounding a user. The control component may be configured to control the one or more lights sources to generate one or more views of one or more instances of one or more virtual objects. Individual instances of individual virtual objects may be perceived as being removably attached to individual sockets in a set of sockets of the annular dock.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
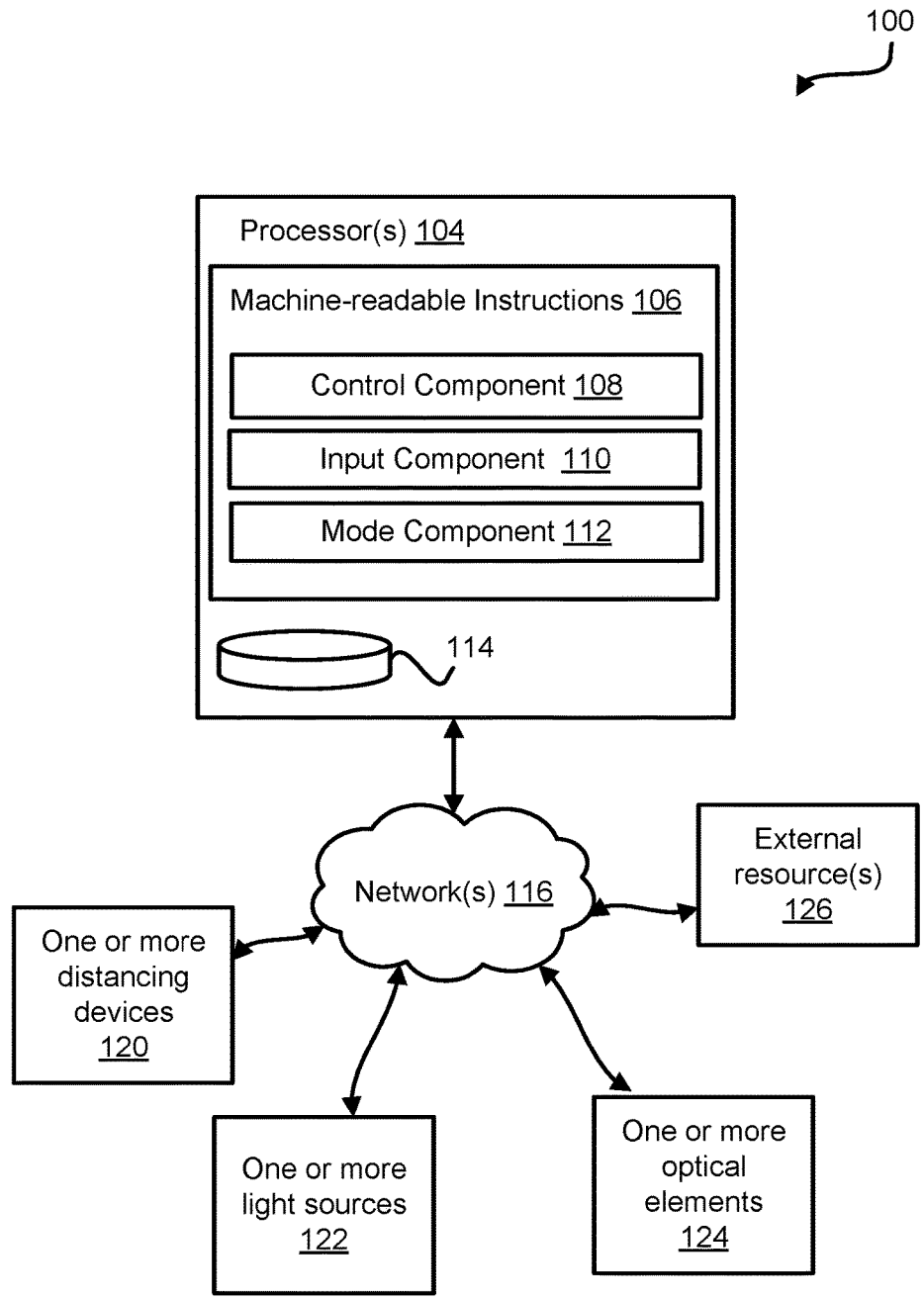
FIG. 1 illustrates a system configured for providing views of virtual content in an augmented reality environment, in accordance with one or more implementations.

FIG. 1 shows a system 100 configured for providing views of virtual content in an augmented reality environment. The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems, as described herein, employing hardware and/or software architectures to form virtual content (e.g., digital images) that may be located and/or perceived to be located in real-world space by virtue of the principles of the depth sensitive modules of the human brain. It is noted that while one or more features and/or functions of system 100 presented herein may be directed toward an augmented reality environment, this is for illustrative purposely only and is not to be considered limiting. In some implementations, one or more features and/or functions of system 100 may be similarly implemented for virtual environments and/or other interactive environments.

The system 100 may include one or more of one or more physical processors 104, one or more distancing devices 120, one or more light sources 122, one or more optical elements 124, and/or other components. In some implementations, one or more components of system 100 may be incorporated in a head-mounted display (HMD), and/or other devices. By way of non-limiting illustration, one or more optical elements 124 may comprise at least part of a visor of an HMD. An optical element may comprise one or more reflective, or partially reflective surfaces on a visor. An optical element may be formed from a reflective or partially reflective material. A reflective and/or partially reflective material may comprise one or more of ZEONEX, polycarbonate, PMMA, and/or other materials.

In some implementations, individual light sources of one or more light sources 122 may comprise one or more of a liquid crystal display (LCD), a light emitting diode (LED) display, surface-conduction electron-emitter display (SED), a plasma display, a transparent organic light emitting diode (OLED) display, a MEMS mirror based display, liquid crystal on silicon (LCoS) display, digital light projector (DLP), a laser, an RGB laser, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be reflected by one or more optical elements 124 to one or more eyes of the user. The user may perceive the reflected light as virtual content in a perceived three-dimensional light field within their field-of-view. In some implementations, control of position and/or light generation of individual light sources 122 may impact one or more aspects of a perceived three-dimensional light field and/or virtual content within the perceived the three-dimensional light field. One or more aspects of a perceived three-dimensional light field may include one or more of a perceived distance of the three-dimensional light field from the user, a depth of the perceived three-dimensional light field, and/or other aspects of the three-dimensional light field. One or more aspects of virtual content within a three-dimensional light field may include one or more of a perceived distance of the virtual content from a user, a depth of the virtual content, a size of the virtual content, and/or other aspects of the virtual content. For example, in some implementations, moving a position of an individual light source closer to an optical element may cause virtual content to be perceived closer to the user; while moving the position of the individual light source farther from the optical element may cause the virtual content to be perceived farther from the user.

Figure 14:
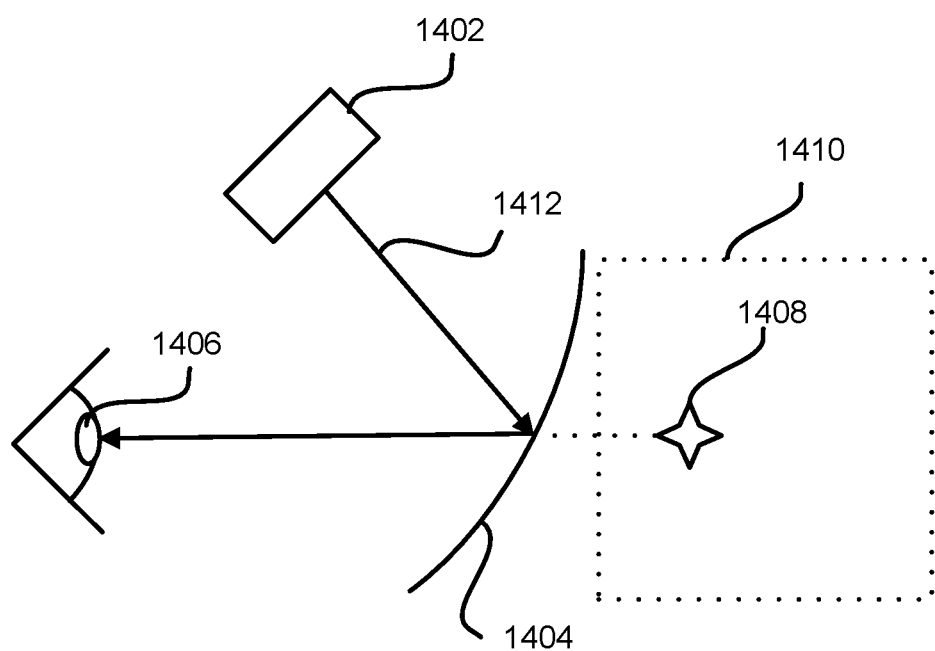
FIG. 14 illustrates an exemplary configuration of a light source and an optical element to generate virtual content to be perceived within a field-of-view of a user.

By way of non-limiting illustration, FIG. 14 shows an exemplary configuration of a light source 1402 and an optical element 1404 for generating virtual content 1408 to be perceived within a three-dimensional light field 1410. In some implementations, one or more of light source 1402, optical element 1404, and/or other components may be incorporated into a head-mounted display, and/or other devices. FIG. 14 shows a light beam 1412 emitted from light source 1402. The light beam 1412 may reflect off optical element 1404 into a user's eye 1406. The light beam 1412 may be part of light generated by light source 1402 to depict a digital image that may correspond to virtual content 1408 to be perceived within the user's field-of-view. In some implementations, position of light source 1402 may be incrementally adjusted to obtain incremental adjustments to a perceived range of virtual content 1408 within three-dimensional light field 1410. In some implementations, the depth and/or bounds of three-dimensional light field 1410 may be limited by an adjustable range of light source 1402 closer to and/or farther from optical element 1404.

Returning to FIG. 1, one or more physical processors 104 may include and/or may be coupled to non-transitory electronic storage media 114 and/or other components. The non-transitory electronic storage media 114 may be configured to store virtual content information and/or other information. Virtual content information may define virtual content. Virtual content may be defined based on one or more of size, shape, color, geometry, functionality, and/or other defining aspects. In some implementations, virtual content may include one or more of one or more annular docks, one or more virtual objects, and/or other virtual content.

An annular dock may comprise an annular-shaped virtual structure that may be perceived within a viewing user's field-of-view. The annular dock may be configured to be perceived as surrounding a user. The annular dock may be configured to be manipulated in an augmented reality environment. By way of non-limiting illustration, the annular dock may be rotatable, translatable, expandable, contractible, and/or may be manipulated in an augmented reality environment in other ways. In some implementations, manipulation of an annular dock in an augmented reality environment may be based on user input and/or other input (see, e.g., input component 110).

In some implementations, an annular dock may be perceived as a voluminous body. For example, the annular dock may be perceived as having a visible cross-sectional area. In some implementations, an annular dock may be perceived as having little or no cross-sectional area and/or volume. For example, the annular dock may be configured as a line with no perceivable volume.

In some implementations, an annular dock may comprise a set of sockets and/or other components. Individual sockets may be positioned at discrete locations on the annular dock. For example, the set of sockets may be arranged with regular spacing around the annular dock, and/or arranged in other ways. In some implementations, the set of sockets may include at least one socket. Individual sockets may be distinctly visible on an annular dock. For example, an individual socket may be visually represented as an individual round nodule attached to and/or included on an annular dock. Individual sockets may have other shapes and/or forms.

An annular dock may be configured to simulate removable attachment of individual virtual objects to individual sockets of the annular dock. In some implementations, attachment of a virtual object to a socket may comprise at least one surface of the virtual object simulating a contact with at least one surface of a given socket. In some implementations, attachment of a virtual object to a socket may comprise at least one surface of the virtual object being within a threshold distance from at least one surface of a given socket. By way of non-limiting illustration, a virtual object may be a "attached" to a socket yet may be visually represented as "hovering" over the socket by the threshold distance, and/or other distances. When a virtual object is in an attached state attached to a socket of an annular dock, the virtual object may move with the annular dock as the annular dock is manipulated within an augmented reality environment.

In some implementations, a detachment of a virtual object from a socket of an annular dock may be facilitated based on the virtual object being moved away from the annular dock. In some implementations, when a virtual object is detached from a socket, changes in position (e.g., also referred to as "positional state") of the virtual object may be facilitated. Changing positional state of individual virtual objects may be based on user input and/or other input (see, e.g., input component 110). In some implementations, a detachment of virtual object from a socket may require an amount of simulated "force" to be applied to the virtual object. Application of simulated force to individual virtual objects may be based on user input and/or other input (see, e.g., input component 110).

In some implementations, an individual annular dock may have one or more operational modes. In some implementations, an operational mode of an annular dock may correspond to enablement or disablement of a feature of removable attachment of individual virtual object to individual sockets of the annular dock (see, e.g., mode component 112).

Individual virtual objects may be defined by one or more of size, shape, color, surface indicia, functionality, and/or other defining aspects. In some implementations, shapes of virtual objects may include one or more of spherical, planar, two- or three-dimensional polyhedron, and/or other shapes. Surface indicia on a virtual object may include one or more of text, graphics, images, and/or other indicia. In some implementations, surface indicia on a virtual object may identify the virtual object.

In some implementations, individual virtual objects may be associated with one or more application programs. An individual virtual object may be associated with an individual application program by virtue of the individual virtual object providing an interface to the individual application program. An application program may include one or more of a web-browser, a video game, a word processor, a three-dimensional object file, a gallery of application programs, a virtual desktop, applications running on a virtual desktop, personal contacts, one or more software-enabled applications used in an augmented reality environment, and/or other application programs.

By way of non-limiting illustration, a first virtual object may be associated with a first application program. The first virtual object may comprise a planar-shaped virtual object and/or other virtual object. The first application program may comprise a web browser and/or other application program. The first virtual object may be configured to depict a web browser interface. The first virtual object may be configured to be presented in front of a user as an interface to access to the Internet. Input into the web browser may be provided by user input and/or other input (see, e.g., input component 110).

Individual virtual objects be of one or more virtual object types. In some implementations, virtual object types may include one or more of a single-instance type, a multi-instance type, and/or other object types.

An instance of a single-instance type virtual object may be a standalone instance of the virtual object within an augmented reality environment. By way of non-limiting illustration, removal of an instance of an individual virtual object of a single-instance type from an attachment with an individual socket may facilitate changes in positional state of the individual instance of the individual virtual object.

In some implementations, an instance of a single-instance type virtual object associated with an application program may maintain state of the application program. The state of the application program may be changed based on user input. The instance of the single-instance type virtual object may "save" the state of the application program. That is, the state of the application program may persist with the instance of the single-instance type virtual object.

An instance of a multi-instance type virtual object may facilitate generating other instances of the virtual object within an augmented reality environment. By way of non-limiting illustration, removal of an instance of an individual virtual object of a multi-instance type from an attachment with an individual socket may cause the instance of the individual virtual object of the multi-instance type to maintain the attachment with the individual socket. Removal of the instance of an individual virtual object of the multi-instance type from the attachment with the individual socket may cause one or more other instances of the individual virtual object to be generated. For example, another instance of the virtual object that may be generated may be manipulated in the augmented reality environment such that changes in positional state of the other instance of the individual virtual object may be facilitated. In some implementations, the other instance of the individual virtual object that may be generated may be another multi-instance type virtual object or a single-instance type virtual object.

In some implementations, individual virtual objects may be associated with one or more other virtual objects. In some implementations, a virtual object may be associated with one or more other virtual objects based on the virtual object facilitating generation of views of the one or more other virtual objects. By way of non-limiting illustration, a first virtual object may be associated with a second virtual object and/or other virtual objects. The first virtual object may be associated with the second virtual object by virtue of the first virtual object achieving a threshold positional state causing a view of the second virtual object to be generated. In some implementations, generation of the view of the second virtual object may cause a view of the first virtual object to be removed. For example, when the first virtual object achieves a first positional state (e.g., a perceived location within three-dimensional space), the first virtual object may disappear and a view of the second virtual object may be generated. The second virtual object may be generated to appear at the same perceived location (e.g., having the same positional state) and/or one or more other locations.

In some implementations, state of an application program associated with an instance of a single-instance type virtual object may persist with instances of other virtual objects that may be associated with the instance of the single-instance type virtual object. By way of non-limiting illustration using the above example of the first virtual object associated with the second virtual object, an application program associated with the first virtual object may become associated with the second virtual object once generated. A state of the application program associated with the first virtual object may persist to the second virtual object once generated.

Figure 2:
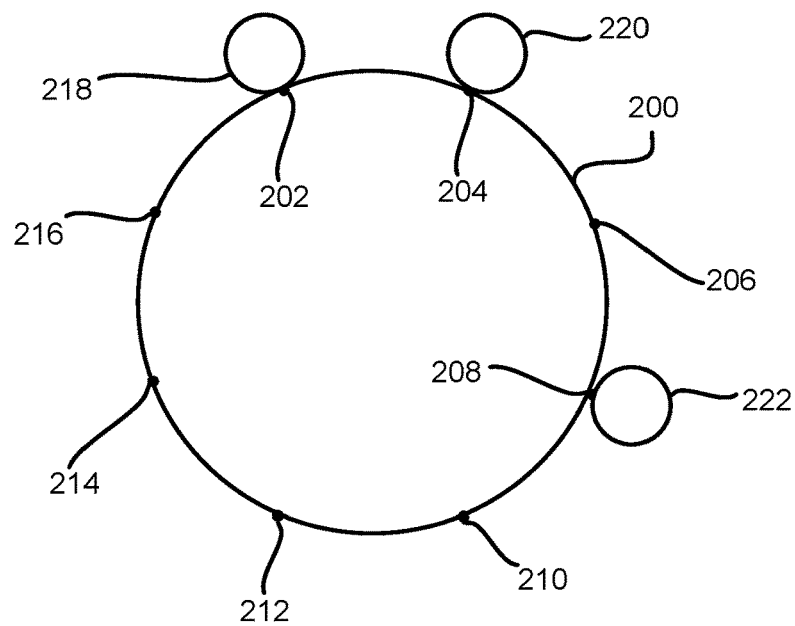
FIG. 2 illustrates a top-down view of virtual content perceived within a field-of-view of a user in an augmented reality environment.

FIG. 2 illustrates a view of virtual content to be perceived within an augmented reality environment. The virtual content may include one or more of an annular dock 200, one or more virtual objects, and/or other virtual content. The one or more virtual objects may include one or more of a first virtual object 218, a second virtual object 220, a third virtual object 220, and/or other virtual objects. In some implementations, individual virtual objects may be represented as spheres and/or other shapes.

In some implementations, annular dock 200 may include a set of sockets and/or other components. The set of sockets may include one or more of a first socket 202, a second socket 204, a third socket 206, a fourth socket 208, a fifth socket 210, a sixth socket 212, a seventh socket 214, an eighth socket 216, and/or other sockets. Individual virtual objects may be removably attachable to individual sockets. By way of non-limiting illustration, first virtual object 218 may be removably attached to first socket 202, second virtual object 220 may be removably attached to second socket 204, third virtual object 222 may be removably attached to fourth socket 208, and/or other virtual objects may be removably attached to other sockets. It is noted that the depicted attachments of first virtual object 218, second virtual object 220, and third virtual object 222 on corresponding sockets is provided for illustrative purposes only and is not to be considered limiting. For example, individual virtual objects may be removed from individual sockets, attached to other sockets, positioned within three-dimensional space and perceived within the users field-of-view, and/or may be manipulated in other ways.

Figure 3:
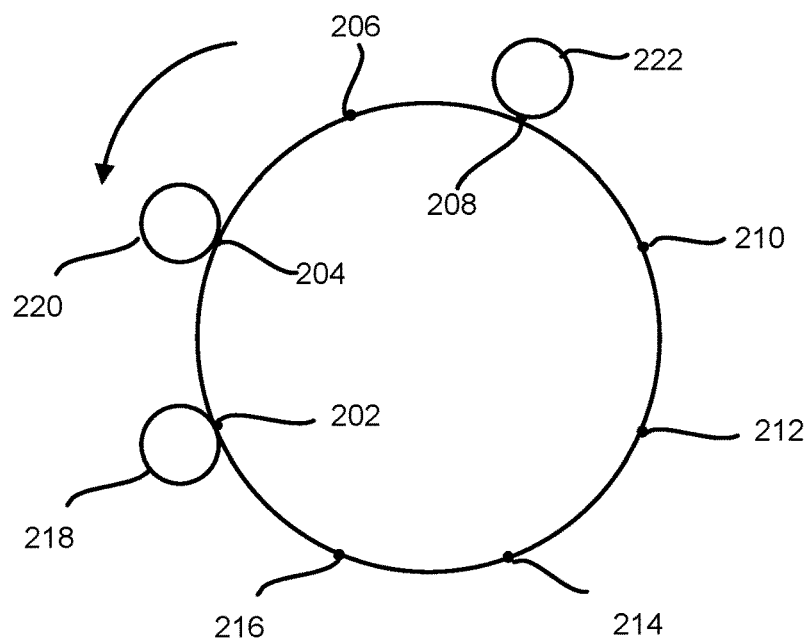
FIG. 3 illustrates a top-down view of virtual content perceived within a field-of-view of a user in an augmented reality environment.

FIG. 3 illustrates annular dock 200 rotated counterclockwise. In some implementations, rotational positioning of annular dock 200 may allow a stationary user to change the virtual object(s) and/or socket(s) that may be in front of them within their field-of-view. By rotating annular dock 200, different virtual objects and/or sockets may be made readily accessible to a user in an augmented reality environment. It is noted that the rotation in the counterclockwise direction is for illustrative purposes and is not to be considered limiting. For example, in some implementations, annular dock 200 may be rotatable in one or more directions.

Figure 4:
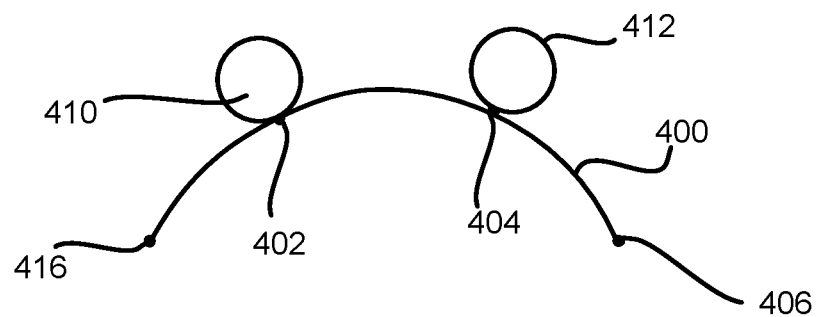
FIG. 4 illustrates a view of virtual content perceived within a field-of-view of a user in an augmented reality environment.

FIG. 4 illustrates a view of virtual content to be perceived within an augmented reality environment. The virtual content may include one or more of an annular dock 400, one or more virtual objects, and/or other virtual content. The one or more virtual objects may include one or more of a first virtual object 410, a second virtual object 412, a third virtual object 418, and/or other virtual objects.

FIG. 4 shows a partial view of annular dock 400. The annular dock 400 may include a set of sockets and/or other components. The set of sockets may include one or more of a first socket 402, a second socket 404, a third socket 406, a fourth socket 408 (FIG. 5), a fifth socket 410 (FIG. 5), a sixth socket (not shown), a seventh socket (not shown), an eighth socket 416, and/or other sockets. The partial view may include an arc segment of the annular dock 400. The arc segment may comprise a segment of annular dock 400 that may be in front of a user and/or positioned to be accessible by the user. By way of non-limiting illustration, annular dock 400 may be hoop-shaped annular dock (see, e.g., annular dock 200 in FIGS. 2-3), however, individual arc segments may be made visible based on the rotated position of annular dock 400.

Figure 5:
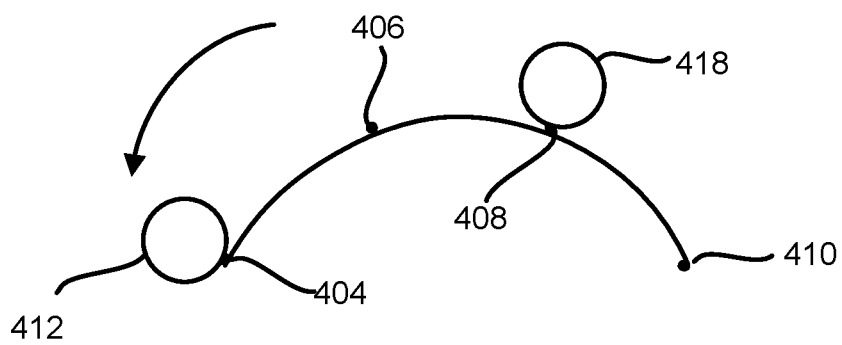
FIG. 5 illustrates a view of virtual content perceived within a field-of-view of a user in an augmented reality environment.

FIG. 5 illustrate annular dock 400 rotated counterclockwise. In some implementations, rotational positioning of annular dock 400 may allow a stationary user to change the virtual object(s) and/or socket(s) that may be in front of them within their field-of-view. By rotating annular dock 400, different virtual objects and/or sockets may be made readily accessible to a user in an augmented reality environment. As annular dock 400 is rotated, segments of annular dock 400 not within a field-of-view may not be visibly generated.

Returning to FIG. 1, individual distancing devices of one or more distancing devices 120 may be configured to generate output signals conveying positions of one or more surfaces of one or more real-world objects within a real-world environment. In some implementations, a position of a surface may be expressed as one or more of distance from an individual distancing device, an angle from reference line (e.g., a horizontal line), and/or other information. By way of non-limiting illustration, a position may be represented as a vector having vector components. In some implementations, one or more distancing devices 120 may include one or more of a camera, a three-dimensional scanner, a depth sensor, a rangefinder, a laser gauge, a time-of-flight sensor, an IR camera/emitter pair, a passive, structured, or unstructured light stereo pair, and/or other devices. In some implementations, sensor output of an individual distancing device may comprise a point cloud and/or other output. A point cloud may include a set of points that may lie on surfaces of real-world objects within a range of the distancing device, and/or other sensor output.

In some implementations, a distancing device may comprise a camera. Output of the camera may comprise images of real-world objects. Position of the real-world object in the images may be determined through one or more object recognition, position triangulation, and/or other techniques.

The one or more physical processors 104 may be configured by machine-readable instructions 106. Executing machine-readable instructions 106 may cause one or more physical processors 104 to facilitate providing views of virtual content in an augmented reality environment. The machine-readable instructions 106 may include one or more of a control component 108, an input component 110, a mode component 112, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include one or more of control of light generation and/or emission in accordance with instances of virtual content to be generated and presented in an augmented reality environment, control of position of individual light sources of one or more light sources 122, and/or other types of control.

By way of non-limiting illustration, control component 108 may be configured to control a first light source of one or more light sources 122 to generate views of virtual content. The views of the virtual content may be generated such that the virtual content may be perceived within s three-dimensional light field within a user's field-of-view. The control component 108 may be configured to control the first light source and/or other light sources to generate a view of an instance of an annular dock to be perceived as surrounding a user. The control component 108 may be configured to control the first light source and/or other light sources to generate a view of an instance of a first virtual object to be perceived as being removably attached to a first socket in a set of sockets of the annular dock.

The input component 110 may be configured to obtain user input for manipulating virtual content in an augmented reality environment. The user input may comprise gesture based input and/or other input. In some implementations, user input may be derived from one or more of sensor output of one or more distancing device 120, sensor output from one or more other sensors, and/or other sources. By way of non-limiting illustration, input component 110 may be configured to detect and/or recognize one or more real-world objects based on sensor output from one or more distancing devices 120 and/or other sources. A real-world object that may be recognized may include, for example, a human hand. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object.

In some implementations, input component 110 may be configured to identify gestures and/or actions being performed by one or more real-world objects. A gesture and/or action may include one or more of reaching, grabbing, releasing, swiping, pinching, pulling, throwing, pointing, and/or other gestures and/or actions of real-world objects. By way of non-limiting illustration, input component 110 may utilize one or more gesture recognition techniques to identify one or more gestures and/or actions being performed by one or more real-world objects. The input component 110 may be configured to provide one or more identified gestures and/or actions as user input for manipulating virtual content in an augmented reality environment.

By way of non-limiting illustration, input component 110 may be configured to obtain user input comprising gesture-based input for manipulating an annular dock in an augmented reality environment. An annular dock may be manipulated based on one or more of a gesture of grabbing the annular dock, a gesture of holding the annular dock, changing positional state of the annular dock while the annular dock is in a held state, expanding the diameter of the annular dock while the annular dock is in a held state, contracting the diameter of the annular dock while the annular dock is in a held state, a gesture of releasing the annular dock from a held state, and/or other input.

Input component 110 may be configured to obtain user input comprising gesture-based input for manipulating one or more virtual objects. A virtual object may be manipulated based on one or more of a gesture of grabbing the virtual object, a gesture of holding the virtual object, changing positional state of the virtual object while the virtual object is in a held state, a gesture of releasing the virtual object from a held state, a gesture of throwing the virtual object, and/or other input.

In some implementations, input component 110 may be configured to determine an amount of simulated "force" a user may be applying to a virtual object and/or annular dock. In some implementations, force may be determined based on one or more of a speed at which a gesture may be performed, a velocity at which a gesture may be performed, an acceleration at which a gesture may be performed, and/or other information. By way of non-limiting illustration, the faster a user moves their hand while holding a virtual object, the greater a simulated force may be determined to be applied to the virtual object.

In some implementations, the mode component 112 may be configured to determine individual operational modes of individual annular docks. In some implementations, an operational mode of an annular dock may correspond to enablement or disablement of a feature of removable attachment of individual virtual object to individual sockets of the annular dock. In some implementations, individual operational modes of individual annular docks may be determined based on positional state of the individual annular docks.

By way of non-limiting example, in a first operational mode of an annular dock, removable attachment of individual virtual objects to individual sockets of the annular dock may be enabled. In the first operational mode of an annular dock, attachment and/or detachment of individual virtual objects to individual sockets of the annular dock may be accomplished by one or more techniques presented herein.

By way of non-limiting example, in a second operational mode of an annular dock, removable attachment of individual virtual objects to individual sockets of the individual annular dock may be disabled. In the second operational mode of an annular dock, an individual virtual object that may be attached to an individual socket may appear as being "locked" to the individual socket. By way of non-limiting illustration, in the second operational mode, an individual virtual object that may be attached to an individual socket may be unable to be detached from the individual socket (e.g., until a change in operational mode occurs). In the second operational mode, an individual virtual object may be unable to be attached to an individual socket. By way of non-limiting illustration, in the second operational mode, an individual virtual object may not achieve an attached state with an individual socket even if the individual virtual object contacts the individual socket and/or comes within a threshold distance from the individual socket.

In some implementations, individual operational modes of an individual annular dock may correspond to individual positional states of the individual annular dock. In some implementations, a positional state of an annular dock may correspond to one or more of a perceived position of the annular dock with respect to a user, a diameter of the annular dock, and/or other positional states. By way of non-limiting illustration, an annular dock perceived to be positioned at a first location with respect to a user (e.g., around their waist and/or other locations) may correspond to a first operational mode of the annular dock. By way of non-limiting illustration, an annular dock perceived to be positioned at a second location with respect to a user (e.g., around their chest and/or other location) may correspond to a second operational mode of the annular dock. By way of non-limiting illustration, an annular dock having a diameter that may be equal to and/or greater than a threshold diameter may correspond to a first operational mode of the annular dock. By way of non-limiting illustration, an annular dock having a diameter that be equal to and/or less than a threshold diameter may correspond to a second operational mode of the annular dock.

Figure 6:
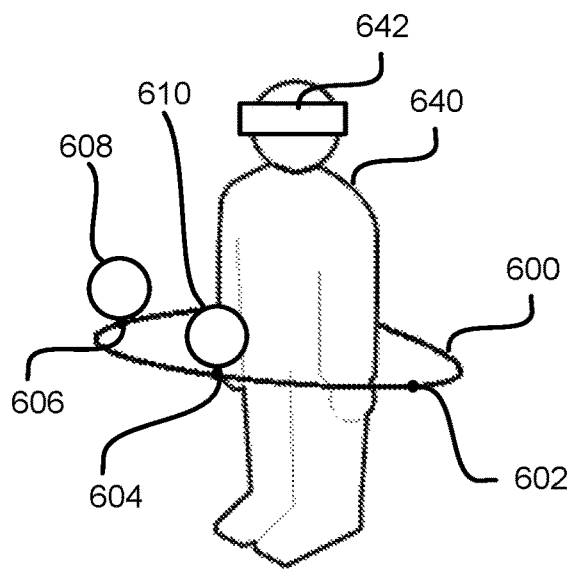
FIG. 6 illustrates an exemplary configuration of virtual content with respect to a user in an augmented reality environment.

FIG. 6 illustrates an exemplary configuration of virtual content with respect to a user 640 in an augmented reality environment, in accordance with one or more implementations of system 100 (FIG. 1) presented herein. The user 640 may be wearing an HMD 642 and/or other components. The HMD 642 may include one or more components of system 100 (FIG. 1) to facilitate providing views of virtual content in the augmented reality environment. The virtual content may include one or more of an annular dock 600, one or more virtual objects, and/or other virtual content. The annular dock 600 may include a set of sockets and/or other components. The set of sockets may include one or more of a first socket 602, a second socket 604, a third socket 606, and/or other sockets. The one or more virtual objects may include one or more of a first virtual object 608, a second virtual object 610, and/or other virtual objects. The first virtual object 608 may comprise single-instance type virtual object. The second virtual object 610 may comprise a multi-instance type virtual object.

In some implementations, views of annular dock 600 may be generated such that annular dock 600 may be perceived as surrounding user 640. The annular dock 600 may be adjustable in one or both of positional state and/or rotational state. By way of non-limiting illustration, a user may provide input (e.g., gesture-based input and/or other input) to change one or both of a positional state and/or rotational state of annular dock 600. Changing rotational state may allow user 640 to change which of the sockets and/or virtual objects may be positioned in front of the user and/or otherwise made accessible to user 640 within their field-of-view. Changing positional state may adjust accessibility of individual sockets and/or virtual objects within the user's reach. In some implementations, changing positional state may facilitate changing between operational modes of annular dock 600 (see, e.g., FIGS. 12 and 13).

Figure 7:
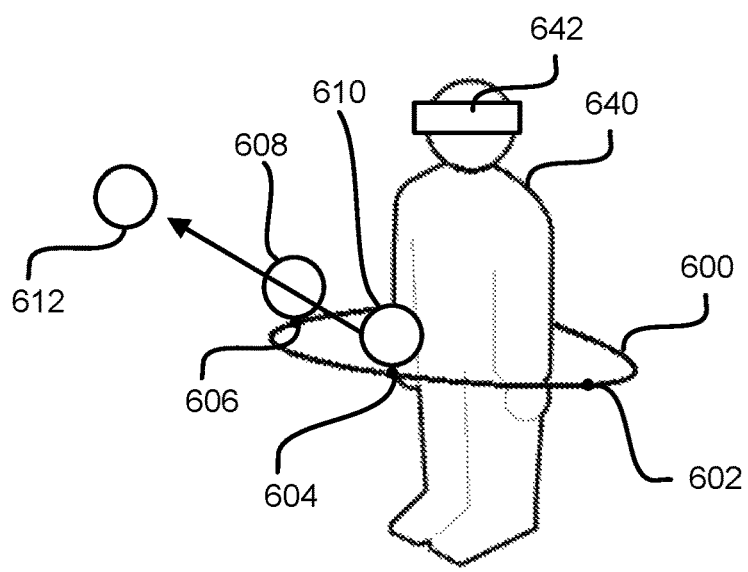
FIG. 7 illustrates an exemplary configuration of virtual content with respect to a user in an augmented reality environment.

FIG. 7 illustrates another exemplary configuration of virtual content with respect to user 640 in the augmented reality environment. In particular, FIG. 7 illustrates an interaction of user 640 with second virtual object 610. User 640 may provide input (e.g., a gesture input such as "grabbing," "holding," and/or other input) to remove second virtual object 610 from second socket 604. When second virtual object 610 is of the multi-instance type virtual object, the user input to remove second virtual object 610 may result in an associated third virtual object 612 being generated and appearing as being "removed" from second virtual object 610. The third virtual object 612 may comprise a new instance of second virtual object 610. The second virtual object 610 may persist in its attachment to second socket 604. The user 640 may perceive themselves as holding on to third virtual object 612 in three-dimensional space within their field-of-view.

Figure 8:
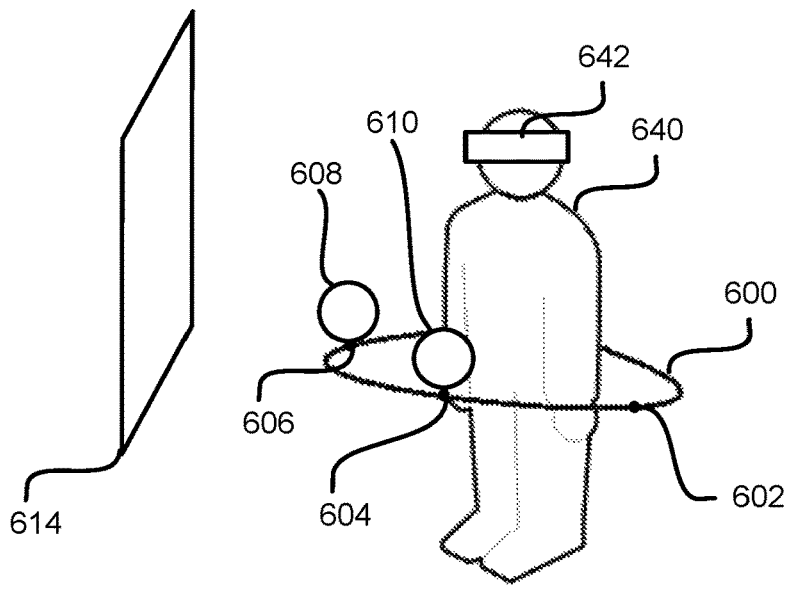
FIG. 8 illustrates an exemplary configuration of virtual content with respect to a user in an augmented reality environment.

FIG. 8 illustrates another exemplary configuration of virtual content with respect to user 640 in an augmented reality environment. In particular, input by user 640 to grab third virtual object 612 (FIG. 7) may allow user 640 to place third virtual object 612 in three-dimensional space within their field-of-view by providing second input (e.g., a gesture input such as "releasing" a "hold" on third virtual object 612, and/or other input). The second input may facilitate effectuating display of one or more additional associated virtual objects. For example, by releasing third virtual object 612 (FIG. 7) in three-dimensional space within their field-of-view, a view of an associated fourth virtual object 614 may be generated. The fourth virtual object 614 may be generated to be perceived in three-dimensional space in the users field-of-view at or near the position of release of third virtual object 612 (FIG. 7).

Figure 9:
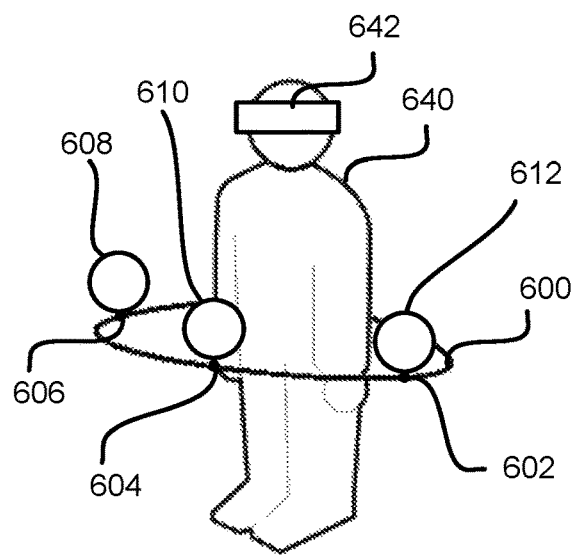
FIG. 9 illustrates an exemplary configuration of virtual content with respect to a user in an augmented reality environment.

In some implementations, third virtual object 612 (FIG. 7) may be associated with an application program (e.g., a web browser and/or other application program). The application program may also be associated with the fourth virtual object 614. The fourth virtual object 614 may comprise a planar virtual object that may provide an interface to the application program. A state of the application program may persist with the fourth virtual object 614 and/or third virtual object 612 (FIG. 7). For example, the user may perform a gesture of grabbing fourth virtual object 614. The gesture of grabbing fourth virtual object 614 may cause the third virtual object 612 (FIG. 7) to reappear, and fourth virtual object 614 may disappear (FIG. 9). A state of the application program based on user interaction with fourth virtual object 614 may persist to third virtual object 612 (FIG. 7).

FIG. 9 illustrates another exemplary configuration of virtual content with respect to user 640 in the augmented reality environment. User 640 may provide input (e.g., a gesture input such as "grabbing," and/or other input) with respect to fourth virtual object 614 (FIG. 8). For example, user input such as grabbing fourth virtual object 614 may re-generate third virtual object 612. The user 640 may provide input (e.g., gesture input) to move third virtual object 612 to a socket, such as first socket 602. Third virtual object 612 may be of a single-instance type virtual object. For example, third virtual object 612 may be representative of the state of the application program associated with fourth virtual object 614 (FIG. 8).

Figure 10:
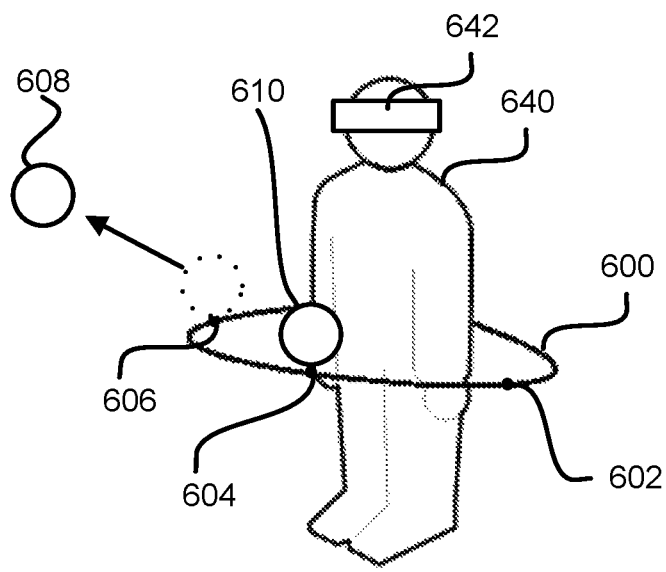
FIG. 10 illustrates an exemplary configuration of virtual content with respect to a user in an augmented reality environment.

FIG. 10 illustrates another exemplary configuration of virtual content with respect to user 640 in the augmented reality environment. In particular, FIG. 10 illustrates an interaction of user 640 with first virtual object 608. The user 640 may provide input (e.g., a gesture input such as "grabbing," "holding," and/or other input) to remove first virtual object 608 from third socket 606. When first virtual object 608 is of the single-instance type virtual object, the user input to remove first virtual object 608 may result in the instance of first virtual object 608 being removed from third socket 606. The first virtual object 608 may be manipulated by the user to change its positional state within the users field-of-view. The user 640 may perceive themselves as holding on to first virtual object 608 in three-dimensional space within their field-of-view.

Figure 11:
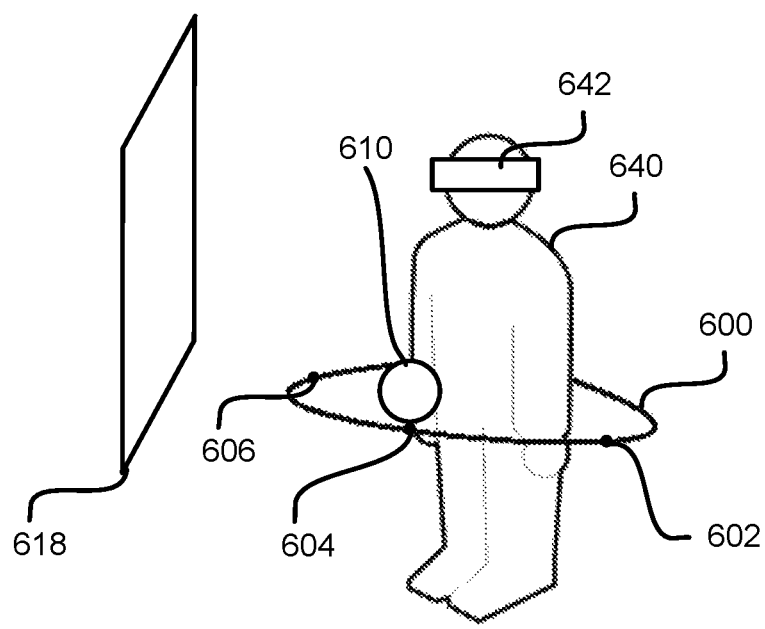
FIG. 11 illustrates an exemplary configuration of virtual content with respect to a user in an augmented reality environment.

FIG. 11 illustrates another exemplary configuration of virtual content with respect to user 640 in an augmented reality environment. In particular, input by user 640 to grab first virtual object 608 (FIG. 10) may allow user 640 to place first virtual object 608 in three-dimensional space within their field-of-view by providing second input (e.g., a gesture input such as "releasing" the "grab" on first virtual object 608, "throwing" first virtual object 608, and/or other input). The change in positional state of first virtual object 608 may facilitate effectuating display of one or more associated virtual objects. For example, when first virtual object 608 (FIG. 10) achieves a threshold positional state (e.g., an arm's length away from user 640 and/or other position) in three-dimensional space, a fifth virtual object 618 may be generated. The fifth virtual object 618 may be generated to be perceived in three-dimensional space in the users field-of-view at or near the position of release of the first virtual object 608 (FIG. 10). User 640 may provide input (e.g., a gesture input such as "grabbing," and/or other input) with respect to fifth virtual object 618. For example, user input such as grabbing fifth virtual object 618 may re-generate first virtual object 608. The user 640 may provide input (e.g., gesture input) to move first virtual object 608 back to a socket.

Figure 12:
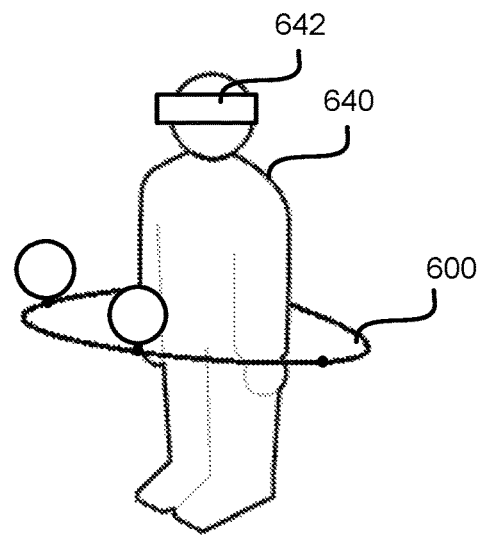
FIG. 12 illustrates an exemplary configuration of virtual content with respect to a user in an augmented reality environment.

FIG. 12 illustrates another exemplary configuration of virtual content with respect to a user in an augmented reality environment. For example, annular dock 600 may be in a first positional state (e.g., around a user's waist). The first positional state may correspond to a first operational mode of annular dock 600.

Figure 13:
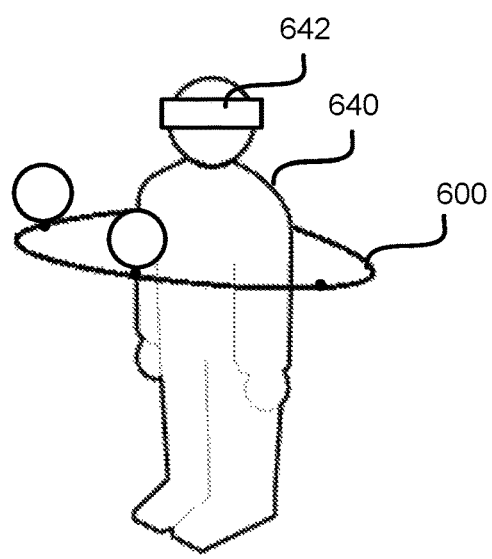
FIG. 13 illustrates an exemplary configuration of virtual content with respect to a user in an augmented reality environment.

FIG. 13 illustrates another exemplary configuration of virtual content with respect to a user in an augmented reality environment. For example, annular dock 600 may be in a second positional state (e.g., around a user's chest). The second positional state may correspond to a second operational mode of annular dock 600.

Returning to FIG. 1, processor(s) 104, one or more distancing device 120, one or more light sources 122, one or more optical elements 124, external resources 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more distancing device 120, one or more light sources 122, one or more optical elements 124, external resources 126, and/or other components of system 100 may be operatively linked via some other communication media.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 114, and/or other components. The processor(s) 104 may include communication lines or ports to enable the exchange of information with a network, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, and/or 112. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, 112, and/or other components. As another example, processor(s) 104 may be configured to execute one or more additional components that may perform some or all of the functionality attributed to one of components 108, 110, and/or 112.

Figure 15:
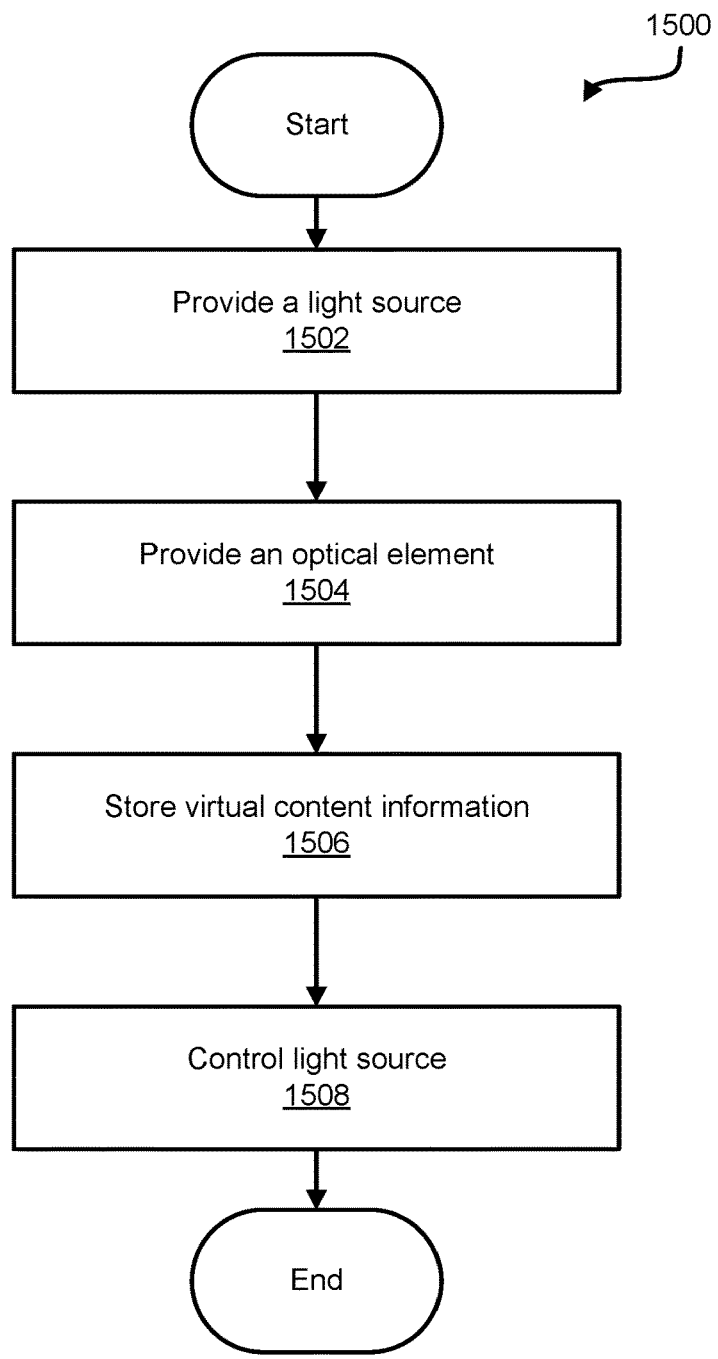
FIG. 15 illustrates a method of providing views of virtual content in an augmented reality environment, in accordance with one or more implementations.

FIG. 15 illustrates a method 1500 of providing views of virtual content in an augmented reality environment, in accordance with one or more implementations. The operations of method 1500 presented below are intended to be illustrative. In some implementations, method 1500 may be accomplished with one or more additional operations not described, and/or without one or more of the operations discussed. Additionally, the order in which the operations of method 1500 are illustrated in FIG. 15 and described below is not intended to be limiting.

In some implementations, method 1500 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more distancing devices, one or more optical elements, and/or other components. The one or more processing devices may include one or more devices executing some or all of the operations of method 1500 in response to instructions stored electronically on electronic storage medium. The one or more processing devices may include one or more devices configured through hardware, firmware, and/or software to be specifically designed for execution of one or more of the operations of method 1500.

At an operation 1502, one or more light sources may be provided. A light source may be configured to emit light. In some implementations, operation 1502 may be performed using one or more light sources the same as or similar to one or more light sources 122 (shown in FIG. 1 and described herein).

At an operation 1504, one or more optical elements may be provided. An optical element may be configured to reflect light emitted from one or more light sources in a perceived three-dimensional light field within a field-of-view of the user. In some implementations, operation 1504 may be performed using one or more optical elements the same as or similar to one or more optical elements 124 (shown in FIG. 1 and described herein).

At an operation 1506, virtual content information and/or other information may be stored. The virtual content information may device virtual content. The virtual content may include one or more of one or more annular docks, one or more virtual objects, and/or other virtual content. A annular dock may comprise a set of sockets and/or other components. Individual sockets positioned at discrete locations on the annular dock. The annular dock may be configured to simulate removable engagement of individual virtual objects to individual sockets. In some implementations, operation 1506 may be performed by non-transitory electronic storage the same or similar to non-transitory electronic storage 114 (shown in FIG. 1 and described herein).

At an operation 1508, one or more lights sources may be controlled to generate views of virtual content. The virtual content may be generated to be perceived within a three-dimensional light field. By way of non-limiting illustration, a light source may be controlled to generate a view of an instance of an annular dock to be perceived as surrounding a user. By way of non-limiting illustration, a light source may be controlled to generate a view of an instance of a first virtual object to be perceived as being removably attached to a first socket in a set of sockets of the annular dock. In some implementations, operation 1508 may be performed by one or more physical processors executing a control component the same as or similar to control component 108 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured for providing views of virtual content in an augmented reality environment, the system comprising:
    a light source configured to emit light;
    an optical element, the optical element being configured to reflect light emitted from the light source in a perceived three-dimensional light field within a field-of-view of a user;
    non-transitory electronic storage storing virtual content information, the virtual content information defining virtual content, the virtual content including:
        an annular dock, the annular dock comprising a set of sockets, individual sockets being positioned at discrete locations on the annular dock, the annular dock being configured to simulate removable engagement of individual virtual objects to individual sockets; and
    one or more physical processors configured by machine-readable instructions to:
        control the light source to generate views of the virtual content, the virtual content being generated to be perceived within the three-dimensional light field, such that the light source is controlled to:
            generate a view of an instance of the annular dock to be perceived as surrounding the user; and
            generate a view of an instance of a first virtual object to be perceived as being removably attached to a first socket in the set of sockets; and
        obtain user input for removably attaching individual instances of individual virtual objects to the individual sockets of the instance of the annular dock, wherein removal of the individual instances of the individual virtual objects from the individual sockets facilitates changing of positional state of the individual instances of the individual virtual objects;
        wherein individual virtual objects are of an individual virtual object type, wherein the virtual object types include a single-instance type and a multi-instance type;
        wherein removal of an instance of an individual virtual object of a single-instance type from an attachment with an individual socket facilitates change in positional state of the individual instance of the individual virtual object; and
        wherein removal of an instance of an individual virtual object of a multi-instance type from an attachment with an individual socket causes the instance of the individual virtual object to maintain the attachment with the individual socket and another instance of the individual virtual object to be generated, such that changes in positional state of the other instance of the individual virtual object is facilitated.

2. The system of claim 1, wherein the one or more physical processors are further configured by machine-readable instructions to:
    obtain user input for changing positional state of the instance of the annular dock, wherein a first positional state corresponds with a first operational mode of the instance of the annular dock and a second positional state corresponds with a second operational mode the instance of the annular dock.

3. The system of claim 2, wherein the first operational mode comprises an enablement of the removable attachment of individual instances of the individual virtual objects to the individual sockets of the instance of the annular dock, and the second operational mode comprises a disablement of the removable attachment of individual instances of the individual virtual objects to the individual sockets of the instance of the annular dock.

4. The system of claim 1, wherein the user input comprises gesture input.

5. The system of claim 1, wherein individual virtual objects are associated with individual application programs.

6. The system of claim 5, wherein an individual virtual object associated with an individual application program provides an interface to the individual application program.

7. The system of claim 6, wherein a state of an individual application program associated with an individual virtual object persists with the individual virtual object.

8. The system of claim 1, further comprising a distancing device, the distancing device being configured to generate output signals conveying positions of one or more surfaces of one or more real-world objects.

9. A method of providing views of virtual content in an augmented reality environment, the method comprising:
providing a light source configured to emit light;
providing an optical element, the optical element being configured to reflect light emitted from the light source in a perceived three-dimensional light field within a field-of-view of a user;
storing, using non-transitory electronic storage, virtual content information, the virtual content information defining virtual content, the virtual content including:
an annular dock, the annular dock comprising a set of sockets, individual sockets being positioned at discrete locations on the annular dock, the annular dock being configured to simulate removable engagement of individual virtual objects to individual sockets;
controlling, using one or more physical processors, the light source to generate views of the virtual content, the virtual content being generated to be perceived within the three-dimensional light field, including controlling the light source to:
generate a view of an instance of the annular dock to be perceived as surrounding the user; and
generate a view of an instance of a first virtual object to be perceived as being removably attached to a first socket in the set of sockets; and
obtaining, using the one or more physical processors, user input for removably attaching individual instances of individual virtual objects to the individual sockets of the instance of the annular dock, wherein removal of the individual instances of the individual virtual objects from the individual sockets facilitates changing of positional state of the individual instances of the individual virtual objects;
wherein the individual virtual objects are of an individual virtual object type, wherein the virtual object types include a single-instance type and a multi-instance type;
wherein removal of an instance of an individual virtual object of a single-instance type from an attachment with an individual socket facilitates change in positional state of the individual instance of the individual virtual object; and
wherein removal of an instance of an individual virtual object of a multi-instance type from an attachment with an individual socket causes the instance of the individual virtual object to maintain the attachment with the individual socket and another instance of the individual virtual object to be generated, such that changes in positional state of the other instance of the individual virtual object is facilitated.

10. The method of claim 9, further comprising
obtaining, using the one or more physical processors, user input for changing positional state of the instance of the annular dock, wherein a first positional state corresponds with a first operational mode of the instance of the annular dock and a second positional state corresponds with a second operational mode the instance of the annular dock.

11. The method of claim 10, wherein the first operational mode comprises an enablement of the removable attachment of individual instances of the individual virtual objects to the individual sockets of the instance of the annular dock, and the second operational mode comprises a disablement of the removable attachment of individual instances of the individual virtual objects to the individual sockets of the instance of the annular dock.

12. The method of claim 9, wherein the user input comprises gesture input.

13. The method of claim 9, wherein individual virtual objects are associated with individual application programs.

14. The method of claim 13, wherein an individual virtual object associated with an individual application program provides an interface to the individual application program.

15. The method of claim 14, wherein a state of an individual application program associated with an individual virtual object persists with the individual virtual object.

16. The method of claim 9, further comprising:
generating, using a distancing device, output signals conveying positions of one or more surfaces of one or more real-world objects.

* * * * *